(12) United States Patent
Steiner et al.

(10) Patent No.: US 11,407,891 B2
(45) Date of Patent: Aug. 9, 2022

(54) EPOXY ACRYLIC HYBRID RESINS

(71) Applicant: ALLNEX AUSTRIA GmbH, Werndorf (AT)

(72) Inventors: Andreas J. Steiner, Graz (AT); Willibald Paar, Graz (AT); Florian Lunzer, Graz (AT); Jörg Christian Karl Wango, Wundschuh (AT); Jacqueline Gröller, Graz (AT)

(73) Assignee: ALLNEX AUSTRIA GMBH, Werndorf (AT)

( * ) Notice: Subject to any disclaimer, the term of this patent is extended or adjusted under 35 U.S.C. 154(b) by 0 days.

(21) Appl. No.: 16/488,678

(22) PCT Filed: Mar. 23, 2018

(86) PCT No.: PCT/EP2018/057473
§ 371 (c)(1),
(2) Date: Aug. 26, 2019

(87) PCT Pub. No.: WO2018/177939
PCT Pub. Date: Apr. 10, 2018

(65) Prior Publication Data
US 2020/0062950 A1 Feb. 27, 2020

(30) Foreign Application Priority Data
Mar. 27, 2017 (EP) .................................... 17163087

(51) Int. Cl.
| | | |
|---|---|---|
| *C08L 63/10* | (2006.01) | |
| *C08G 59/02* | (2006.01) | |
| *C08G 59/16* | (2006.01) | |
| *C08G 59/18* | (2006.01) | |
| *C08L 25/06* | (2006.01) | |
| *C08L 33/08* | (2006.01) | |
| *C08L 33/10* | (2006.01) | |
| *C09D 5/02* | (2006.01) | |
| *C09D 125/06* | (2006.01) | |
| *C09D 133/08* | (2006.01) | |
| *C09D 133/10* | (2006.01) | |
| *C09D 163/10* | (2006.01) | |

(52) U.S. Cl.
CPC .............. *C08L 63/10* (2013.01); *C08G 59/02* (2013.01); *C08G 59/1472* (2013.01); *C08G 59/184* (2013.01); *C08L 25/06* (2013.01); *C08L 33/08* (2013.01); *C08L 33/10* (2013.01); *C09D 5/02* (2013.01); *C09D 125/06* (2013.01); *C09D 133/08* (2013.01); *C09D 133/10* (2013.01); *C09D 163/10* (2013.01); *C08L 2201/54* (2013.01)

(58) Field of Classification Search
CPC .......... C08L 63/10; C08L 25/06; C08L 33/08; C08L 33/10; C08G 59/02; C08G 59/1472; C08G 59/184; C09D 5/02; C09D 125/06; C09D 133/08; C09D 133/10; C09D 163/10
USPC ......................................................... 525/529
See application file for complete search history.

(56) References Cited

U.S. PATENT DOCUMENTS

| | | | | |
|---|---|---|---|---|
| 3,729,435 A | * | 4/1973 | Gerhard ............. | C08G 59/4292 523/402 |
| 6,653,370 B2 | | 11/2003 | Paar et al. | |
| 6,673,877 B2 | | 1/2004 | Paar et al. | |
| 2002/0091195 A1 | * | 7/2002 | Paar ....................... | C08G 59/56 525/54.11 |
| 2012/0027938 A1 | * | 2/2012 | Kitamura ............. | C09D 5/4438 427/372.2 |

FOREIGN PATENT DOCUMENTS

| | | | | |
|---|---|---|---|---|
| JP | 2008-174622 | | 7/2008 | |
| JP | 2009-41003 | | 2/2009 | |
| WO | WO-2015055804 A1 | * | 4/2015 | ............... C25D 5/50 |

OTHER PUBLICATIONS

International Search Report dated Apr. 23, 2018 in International Application No. PCT/EP2018/057473.
Written Opinion of the International Searching Authority dated Apr. 23, 2018 in International Application No. PCT/EP2018/057473.

* cited by examiner

*Primary Examiner* — David T Karst
(74) *Attorney, Agent, or Firm* — Wenderoth, Lind & Ponack, L.L.P.

(57) ABSTRACT

An aqueous dispersion comprising at least one fatty acid-modified epoxy amine adduct wherein the fatty acid has an iodine number of lower than 30 and at least one polymer obtained from the polymerization of one or more ethylenically unsaturated monomers and their use for forming coatings or binder agents, especially for decorative and protective coating applications on various substrates.

17 Claims, No Drawings

EPOXY ACRYLIC HYBRID RESINS

The present invention relates to hybrid systems composed of aqueous dispersions of epoxy/amine adduct resins and polymers of one or more ethylenically unsaturated monomers. The aqueous dispersions according to the present invention are particularly suitable for forming coatings or binder agents, especially for decorative and protective coating applications on various substrates.

In many architectural applications (e.g.: wood coatings (deck stain, trim), metal coatings, . . . ) waterborne resins based on ethylenically unsaturated monomers, typically acrylic or styrene-acrylic resins, are used because of their high chemical stability, good weatherability and water resistance, low VOC and easy synthesis via free radical emulsion polymerization.

On the other hand, epoxy resins are used in a wide range of coating applications, including metal coatings.

In unmodified form, epoxy resins, especially those based on bisphenol A which are customarily used commercially, are very sparingly soluble or insoluble in water. In principle it is possible to obtain water-dilutable, cationically stabilized resins by reacting epoxy resins with amines and then protonating the basic groups. It is also possible, by modifying the epoxy resin with nonionic hydrophilic groups or with anionic groups, to achieve a limited solubility which is sufficient to impart adequate stability to a dispersion of the modified epoxy resin in water. Such dispersions may be diluted with (further) water.

The modified epoxy resin can then be processed from the aqueous dispersion; following removal of the water fraction by evaporation or penetration into the substrate, the resin remains on the surface and, given an appropriate composition of the disperse phase, forms a coalesced film which can be chemically crosslinked by adding appropriate curatives. Since, owing to the ring opening of the epoxide groups, the cationic epoxy-amine adducts contain secondary hydroxyl functions, suitable curatives include compounds which enter into addition reactions or condensation reactions with hydroxyl groups, such as melamine resins, phenolic resins and (blocked) polyfunctional isocyanates.

U.S. Pat. No. 6,673,877 describes unsaturated fatty acid modified epoxy resins for metal coatings. Applicants have found that some of the resins described in this patent could be used for wood coatings as well, but do not have good durability and outdoor weathering performances, especially in cold and wet climates.

U.S. Pat. No. 6,653,370 describes certain water-dilutable epoxy resins, obtainable by an advancement reaction from cationic or cationogenic polyfunctional precursors with diepoxides or polyepoxides, suitable for metal and mineral coatings exhibiting good corrosion protection, without necessitating additional curatives. Some of these resins described in U.S. Pat. No. 6,653,370 are resins of formula ZYWX which have been obtained by first forming an adduct ZYW by reacting an epoxy resin Z with an unsaturated carboxylic acid W to form an hydroxy ester, where the amounts of Z and W were chosen such that a part of the epoxide groups remains unreacted, and then reacting these hydroxy esters ZW under consumption of the remaining epoxide groups with an aliphatic amine Y to yield carboxylic acid-modified epoxy amine adducts ZYW. Another way to form ZYW was to react the unsaturated carboxylic acids W with epoxy amine adducts ZY, in which case the amounts of Z and Y was chosen such that there remain unreacted epoxide groups in the adduct ZY for reaction with the acids W. The compounds ZYW were then at least partly converted into the salt form, transferred to the aqueous phase and then reacted with a further epoxy resin X to form carboxylic acid-modified cationically stabilised water-dilutable epoxy resins ZYWX.

Also disclosed in U.S. Pat. No. 6,653,370 is a hybrid resin resulting from polymerising, in the presence of ZYWX, ethylenically unsaturated monomers V in the presence of radical initiators.

It is however noteworthy that the type of hybrid resins disclosed in U.S. Pat. No. 6,653,370 have intrinsically a very high dynamic viscosity. For this reason, the compositions disclosed in U.S. Pat. No. 6,653,370 and in particular the examples 4 and 5 therein, comprise more than 3.5% butyl glycol as solvent in order to bring down the viscosity to an acceptable level for handling or formulation. The presence of solvents is however not a desirable feature from an ecological perspective.

Furthermore, Applicants have observed that the hybrid resins disclosed in Examples 4 and 5 contain a high amount of unreacted monomers.

Furthermore, although U.S. Pat. No. 6,653,370 states that good adhesion to metals and mineral substrates is achieved by certain water-dilutable epoxy resins disclosed therein, adherence of epoxy resins, and particularly of two components epoxy resins, on some substrates, such as Cathodic ElectroDeposition (CED) pre-coated steel, remains difficult.

Applicants have found that the epoxy amine adducts modified with mainly unsaturated fatty acids do not permit to obtain coating resins for wood applications, especially outdour applications with good properties.

It is hence an object of the present invention to develop new hybrid systems which overcome one or more of the above drawbacks, especially resins that are particularly performant when used for wood coatings, especially for outdoor applications. In particular it was an objective of the present invention to develop a resin which has excellent tannin-blocking performances, excellent marker-blocking performances, and that showed enhanced external durability, especially in cold and wet climates, Therefore, in a first aspect, the present invention relates to an aqueous dispersion comprising:
- at least one fatty acid-modified epoxy amine adduct $ZYW_S$ containing amino groups which are at least partially protonated wherein the fatty acid $W_S$ contains at least 8 carbon atoms and has an iodine number according to DIN 53241-1:1995-05 of lower than 30, and
- at least one polymer V obtained from the polymerization of one or more ethylenically unsaturated monomers.

The aqueous dispersion is preferably obtained by a process comprising the steps of:
a) obtaining a fatty acid-modified epoxy amine adduct $ZYW_S$ by a process comprising the steps of reacting:
   - at least one epoxide compound Z containing at least one, preferably at least two, epoxide groups,
   - at least one amine Y containing at least one primary or secondary amino group, and
   - at least one fatty acid $W_S$, wherein the fatty acid contains at least 8 carbon atoms and has an iodine number according to DIN 53241-1:1995-05 lower than 30,
b) adding to the fatty acid-modified epoxy amine adduct $ZYW_S$ obtained in step (a) water and at least one acid, in an amount such that the ratio acid value/amine value of the fatty acid-modified epoxy amine adduct $ZYW_S$ is at least 0.05 thereby at least partially protonating the amino groups, c) optionally reacting the adduct $ZYW_S$ obtained in step (b) with at least an epoxide compound X having at least one, preferably at least two, epoxy groups per molecule, the amount of said epoxide compound X being such that the equivalent number of amino groups in $ZYW_S$ which are reactive in respect of reaction with an epoxide group is at least equal to the equivalent number of the epoxide groups in the epoxide compound X, and which preferably comprises performing the reaction of $ZYW_S$ and X until epoxide groups are no longer detectable in the reaction mixture, thereby obtaining a compound $ZYW_SX$, and d) polymerizing one or more ethylenically unsaturated monomers in presence of the fatty acid-modified epoxide amine adduct $ZYW_S$ obtained at step (b) or in presence of the compound $ZYW_SX$ obtained at step (c) thereby forming a polymer V.

The process for obtaining a fatty acid-modified epoxy amine adduct $ZYW_S$ typically leads to the production of various oligomers of complex structures and to a structure distribution.

Aqueous solutions obtained after step (b) or (c) present one or more of the following advantages: they may be clear; they may be transparent; they may be stable, even without use of an additional emulsifier or surfactant, for periods longer than 3 months at 40° C.; they may easily enable the polymerization of monomers; they may enable a rapid emulsion polymerization of monomers; they may dispense from any pre-emulsion step for introducing monomers therein in view of their emulsion polymerization; they may permit the formation therein of polymers having multi-domain structures.

Aqueous dispersions obtained after step (d) present one or more of the following advantages: they may have a dynamic viscosity excellent for further handling and formulation, even without the addition of solvent; they may have a very low amount of residual unreacted unsaturated monomers; they may be used to form a binder resin which has excellent tannin-blocking performances; they may be used to form a binder resin which has excellent marker-blocking performances; they may be used to form a binder resin which has cold check performances at least comparable to state of the art binder resins and may show enhanced external durability, especially in cold and wet climates; they may be added to a resin (for instance a waterborne two component epoxy system) and thereby improve its adhesion on substrates, especially on steel pre-coated with a CED resin.

In a second aspect, the present invention relates to the process to prepare the aqueous dispersion according to any embodiment of the first aspect.

In a third aspect, the present invention relates to the use of the aqueous dispersions for the preparation of coatings and to a process for the preparation of a coated article comprising the step of coating at least part of said article with at least one layer of the aqueous dispersion according to the invention and a step of drying said coated substrate in order to remove at least part of the water and form a coated substrate.

As used herein and unless provided otherwise, the term "aqueous dispersion" relates to particles, and typically oligomer and/or polymer particles, dispersed in a continuous aqueous medium.

As used herein and unless provided otherwise, the term "ethylenically unsaturated monomer" relates to a monomer having at least one carbon-carbon double bond which can undergo radical polymerization.

As used herein and unless provided otherwise, the prefix "(meth)acryl" when used to name compounds of the present invention encompasses both "acryl" and "methacryl" and refers to compounds comprising at least one $CH_2=CHCOO$— group or $CH_2=CCH_3COO$— group, as well as mixtures thereof and mixtures of such compounds.

As used herein and unless provided otherwise, the term "water-dilutable" characterizes a dispersion in water that does not undergo spontaneous phase separation and also for which no macroscopic phase separation occurs on storage at room temperature (23° C.) for at least 7 days.

As used herein and unless provided otherwise, the term "cationogenic" characterizes compounds which on addition of acids are able to form cations in the presence of water.

As used herein and unless provided otherwise, the term "surfactant" relates to a compound that reduces interfacial tension between two liquids or a liquid and a solid.

As used herein and unless provided otherwise, the term "emulsifier" relates to a surfactant which is suitable for forming an emulsion in the composition where it is used.

According to a specific embodiment of the present invention, the fatty acid-modified epoxy amine adduct $ZYW_S$ can comprise or can be a chain extended product ($ZYW_SX$) obtained from the reaction of a fatty acid-modified epoxy amine adduct $ZYW_S$ with at least one epoxy compound X. Such chain extended product $ZYW_SX$ is usually obtained by reacting the protonated amino groups of the fatty acid-modified epoxy amine adduct with an epoxide X containing at least one, preferably at least two, epoxy groups.

Step (a) of the processes described here above in relation to the first and second aspects of the present invention relates to obtaining a fatty acid-modified epoxy amine adduct $ZYW_S$ by a process comprising the steps of reacting at least one epoxide compound Z, at least one amine Y and at least one fatty acid $W_S$. Typically, this reaction may be carried out at a temperature of at least 70° C., and preferably at least 100° C. Typically, this reaction may be carried out at a temperature of at most 200° C., and preferably at most 180° C. Optionally, Z, Y and $W_S$ may be reacted in presence of a solvent which is non-reactive toward any of Z, Y or $W_S$. This is however typically not necessary.

The epoxide groups in compound Z typically react faster with primary and/or secondary amino groups present in Y than with carboxylic acid groups present in $W_S$. Also, a primary amino group in Y will react twice with epoxide groups present in Z before to react with carboxylic acid groups in $W_S$. Therefore, if compound Z is reacted with a mixture of Y and $W_S$, the amount of Z and Y are preferably chosen so that after all reactions between Z and Y took place, there remain unreacted epoxide groups for reaction with the fatty acids $W_S$. Fatty acids form hydroxyl esters when reacted with epoxides.

Preferably, the quantity of epoxide Z is chosen such that the equivalent number of epoxide groups provided by compound Z used is superior to the equivalent number of hydrogen atoms attached to nitrogen atoms in the amount of compound Y used.

In a preferred embodiment, the quantity of epoxide Z is such that the equivalent number of epoxide groups provided by compound Z used is about equal to the sum of the equivalent number of hydrogen atoms attached to nitrogen atoms provided by the compound Y and the equivalent number of carboxylic group provided by the fatty acid $W_S$ used.

The amounts of Z, Y and $W_S$ are preferably chosen such that there remain only a slight number of unreacted epoxide groups and/or unreacted amine and/or unreacted carboxylic acid groups.

The fatty acid-modified epoxy amine adduct $ZYW_S$ may be obtained by:
  reacting at least one epoxide compound Z containing at least one epoxide group with one or more fatty acids $W_S$, yielding a hydroxyl ester $ZW_S$ that still has unreacted epoxide groups, and then reacting the hydroxyl ester $ZW_S$ with at least one amine Y, or by
  reacting at least one epoxide compound Z containing at least one epoxide group, with at least one amine Y, yielding an epoxy amine adduct ZY which still has unreacted epoxide groups, and then reacting the epoxy amine adduct ZY with one or more fatty acids $W_S$; or by
  reacting the epoxy compound Z with a mixture of amine Y and fatty acid $W_S$.

The epoxide compound Z used in the present invention may be aromatic or aliphatic. Preferably, the at least one epoxide compound Z has at least two epoxide groups per molecule. Particularly preferred are epoxide compounds comprising two epoxide groups per molecule.

More than one epoxide compound Z may be used. For example an epoxide compound comprising one epoxide group and an epoxide compound comprising two or more, preferably two, epoxide groups may be used. Mixtures of epoxide compounds can be used.

Glycidyl ethers of monohydric aliphatic or mixed aliphatic-aromatic alcohols, or glycidyl esters of aliphatic or aromatic monocarboxylic acids are preferred as monoepoxides. The alcohols and acids are preferably selected from the group consisting of linear or branched aliphatic alcohols or acids having from 5 to 16 carbon atoms. Epoxide compounds Z having on average two epoxide groups per molecule, and preferably having an epoxide equivalent of from 170 g/mol to 333 g/mol are preferred. Particularly preferred compounds Z are diglycidyl ethers of aromatic or aliphatic diols and diglycidyl esters of aromatic or aliphatic diacids, such as the diglycidyl ethers of bisphenol A and of bisphenol F, the diglycidyl ethers of ethylene glycol, 1,4-butylene glycol, and of oligomeric or polymeric 1,2-propylene glycols. Especially preferred is the diglycidyl ether of bisphenol A.

The amine Y used in the present invention is preferably selected from aliphatic, linear, branched or cyclic, amines each having at least one secondary or at least one primary amino group. Preferred are amines having from two to twenty, more preferably from three to twenty, carbon atoms. Mixtures of amines Y can be used.

According to a preferred embodiment of the present invention, the amine Y comprises at least one amine Y1 comprising at least one, preferably one, primary amine group.

According to a preferred embodiment, the amine Y comprises at least one amine Y2 comprising at least one, preferably one, secondary amine group.

According to a preferred embodiment, at least one amine Y1 and at least one amine Y2 are used.

According to a preferred embodiment of the present invention, at least one amine Y1 and/or Y2 is used comprising besides the primary and/or secondary amino group, also at least one tertiary amino group.

The amine Y1 and/or Y2 can contain, besides the primary and/or secondary amino group, also one or more further reactive groups such as hydroxyl groups.

The amines Y1 are preferably aliphatic amines having one tertiary, and at least one primary amino group, and from four to twenty carbon atoms. Preferred amines are N,N-dimethylaminoethylamine, N,N-diethylaminoethylamine, N,N-dimethylaminopropyl-amine-3, N,N-diethylaminopropylamine-3, N-(2-aminethyl)-piperidine, and N,N'-bis(2-aminoethyl)-piperazine. Mixtures of these can also be used.

The amines Y2 are preferably aliphatic amines having one secondary amino group, and from three to twenty carbon atoms, preferably from four to fourteen carbon atoms. Among the preferred amines Y2 are di-n-butylamine, diethanolamine, and bis-2-hydroxypropylamine. Mixtures of these can also be used.

By fatty acids $W_S$, is understood to designate long chain carboxylic acids having one carboxyl group, and at least 8 carbon atoms, preferably from 8 to 30 carbon atoms. For the purpose of the present invention, a fatty acid or a group of more than one fatty acids $W_S$ having collectively an iodine number according to DIN 53241-1:1995-05 lower than 30 will be considered "saturated" because such a low iodine number correspond to number of olefinic double bonds which is not very significant. By "collectively having an iodine number lower than 30", it is meant that when the iodine number is measured on the group of one or more fatty acids $W_S$ as a whole, the value obtained is below 30.

The one or more fatty acids $W_S$ used in the present invention are preferably selected from naturally occurring so-called saturated fatty acids. Such fatty acids very often contain traces or small amounts of unsaturated fatty acids but not leading to an iodine number according to DIN 53241-1:1995-05 of 30 or higher.

Preferably, the fatty acids or the one or more fatty acids $W_S$ preferably have collectively an iodine number according to DIN 53241-1:1995-05 lower than 20.

The fatty acids $W_S$ used in the present invention may be linear or branched. Typically, they may each individually have from 6 to 36 carbon atoms but the group of one or more carboxylic acid Ws has in average at least 8 carbon atoms per molecule constituting the group, preferably an average of from 8 to 30 carbon atoms. Especially preferred fatty acids $W_S$ used in the present invention are Caprylic acid (C8), Decanoic acid (010), Lauric acid (C12), Myristic acid (C14), Palmic acid (C16), Stearic acid (C18), as well as mixtures thereof. Among the fatty acids derived from natural occurring oils, those containing at least 85%, preferably at least 90%, by weight of saturated fatty acids are preferred in the present invention.

The fatty acid-modified epoxy amine adduct $ZYW_S$ preferably has an amine value according to DIN 53176:2002-11 of at least 50 mg KOH/g. Such high amine values are advantageous as they permit to obtain a clear, transparent aqueous solutions after step (b) or (c). In case the amine value is too low, an opaque solution is obtained instead of a clear and transparent solution, which leads to reduced stability thereof. More preferably, the fatty acid-modified epoxy amine adduct $ZYW_S$ has an amine value according to DIN 53176:2002-11 of at least 80 mg KOH/g, and most preferably of at least 120 mg KOH/g. The amine value is usually at most 300 mg KOH/g. Preferably, the nature and the respective amounts of Z, Y and $W_S$ are selected in such a way as to obtain such an amine value.

In Step (b) of the process according to the first and second aspect of the present invention, water and at least one acid are added to the fatty acid modified epoxy amine adduct ZYWs obtained after step (a). The quantity of acid added is chosen in order to obtain a ratio acid value/amine value of the fatty acid modified epoxide amine adduct $ZYW_S$ of above 0.05.

The acid may typically be an organic acid or an inorganic acid. Organic acids are preferred, more specifically volatile acids. Particularly preferred are water-soluble carboxylic acids which have short carbon chains having six carbon atoms or less, preferably 4 carbon atoms or less. Acids are most preferably selected from formic acid, acetic acid and lactic acid.

The quantity of water and acid in step (b) is preferably such that a clear and homogeneous aqueous solution of a $ZYW_S$ adduct at least partially converted into a salt form (or in other words, at least partially protonated) in an aqueous media. The aqueous media is preferably deionized water.

In the conversion step (b) (which may also be called neutralization step b), the amino groups of the fatty acid-modified epoxide amine adduct $ZYW_S$ containing tertiary amino groups obtained at step (a) are totally or partially converted with a protonating agent and the adduct is dissolved in an aqueous media (typically water). By totally or partially converted is meant in the present invention that all or at least part of the amine groups present in the adduct are converted in a salt form by an acid.

Preferably, at least 5% of the amine groups present in the adduct are converted by an acid.

The conversion degree is preferably chosen in such a way that the obtained aqueous dispersion is clear and transparent.

The amount of acid used is typically chosen to yield the desired degree of conversion of the tertiary amino groups present in the adduct $ZYW_S$. The degree of conversion is generally defined as the fraction of tertiary amino groups converted into a salt form in the adduct $ZYW_S$.

Typically, the at least partially converted adduct $ZYW_S$ obtained at step (b) may have a ratio acid value/amine value, corresponding to a conversion degree, of at least 0.1; preferably at least 0.2; more preferably at least 0.3 and most preferably at least 0.4.

Typically, the at least partially converted adduct $ZYW_S$ obtained at step (b) may have a ratio acid value/amine value not larger than 2.0, preferably not larger than 1, more preferably not larger than 0.9 and most preferably not larger than 0.8.

For instance, the ratio acid value/amine value may be from 0.2 to 2.0, preferably from 0.2 to 1.0 and more preferably from 0.3 to 0.8.

Acid values can be determined according to DIN EN ISO 2114:2002-06.

Usually Step (b) is conducted by mixing the adduct $ZYW_S$ containing tertiary amino groups obtained at step (a) and a water/acid solution at a temperature of at least 20° C., preferably at least 40° C., more preferably at least 50° C. The temperature generally does not exceed 90° C., preferably 85° C., more preferably 80° C.

The amount of adduct $ZYW_S$ and the amount of water/acid (protonating agent) solution are typically chosen to yield a solution of the at least partially converted adduct $ZYW_S$ in water of at least 5 weight %, preferably at least 10 weight %, more preferably at least 15 weight % total and most preferably at least 20 weight %. The amount of adduct $ZYW_S$ in the solution is determined according to DIN 55671:2002-09. The amount of adduct $ZYW_S$ is usually not more than 60, preferably not more than 50 weight %.

The mixture of the at least partially converted adduct $ZYW_S$ and water/acid mixture is typically stirred until a homogeneous solution is obtained.

Typically, the mass fraction of solid in the solution may be from 10 to 60%, preferably from 20 to 50%, as determined according to DIN 55671:2002-09.

The aqueous solution obtained at step (b) has typically a pH of at least 4.0, preferably at least 4.5 and more preferably at least 5.0. The pH generally does not exceed 7.0, preferably 6.5 and more preferably 6.0.

In a specific embodiment, the process may further comprise a step (c), after step (b), of reacting the at least partially converted adduct $ZYW_S$ with at least an epoxide compound X having at least one, preferably at least two, epoxy groups per molecule, the amount of each of said at least an epoxide X being such that the equivalent number of amino groups in $ZW_SY$ which are reactive in respect of addition reaction with an epoxide group is at least the same, preferably at least 10% greater and more preferably at least 20% greater, than the equivalent number of the epoxide groups in the at least an epoxide X. This step preferably comprises performing the reaction of $ZW_SY$ and X until epoxide groups are no longer detectable in the reaction mixture, thereby obtaining an aqueous solution comprising a compound $ZYW_SX$. In other words, the amount of the epoxy compound X and the epoxy-amine-fatty acid adduct ZYW may be chosen such that the number of reactive (in respect of addition to the epoxide) amino groups in ZYW is at least the same as that of the epoxide groups in X. This aqueous solution is typically clear and transparent.

Suitable epoxy compounds X are preferably selected from those described in relation with exoxy compounds Z. The epoxy compound X may be the same of different from epoxy compound Z.

The aqueous dispersion obtained at step (c) has typically a pH of at least 4.0, preferably at least 4.5 and more preferably at least 5.0. The pH generally does not exceed 7.0, preferably 6.5 and more preferably 6.0.

Performing step (c) typically leads to the reaction of tertiary amino groups present in ZYWs with X to form cationically-charged quaternary amine functionalities. This reaction can be referred to as a quaternization reaction. It typically only occurs after that all the primary and secondary amino groups have reacted. During reaction the progress of quaternization can be monitored via a decrease in acid value according to DIN EN ISO 2114:2002-06.

Typically, step (c) may be performed at 40° C. or more, preferably 50° C. or more and most preferably 60° C. or more. Typically, step (c) is performed at 100° C. or less, preferably 90° C. or less and most preferably 80° C. or less. A preferred temperature range is 50 to 90° C. and the most preferred temperature range is 60 to 80° C.

The reaction is preferably performed until epoxide groups are no longer detectable in the reaction mixture. Typically, this translates into maintaining a temperature as mentioned for step (c) until epoxide groups are no longer detectable.

The aqueous solution obtained after step (b) or (c) according to specific embodiment of the present invention is usually further characterized by a solid content of from 15 to 35 wt %, preferably from 20 to 30 wt %, as determined according to DIN 55671:2002-09.

The aqueous solutions obtained after step (b) or (c) according to specific embodiment of the present invention may typically have an acid value determined on the solid content of at least 50 mg KOH/g, preferably at least 80 mg KOH/g. The acid value typically does not exceed 150 mg KOH/g, preferably 120 mg KOH/g. It can be measured according to the standard method DIN EN ISO 2114:2002-06.

The process according to the invention further comprises a step (d), after step (b), or if a step (c) has been performed, after step (c). In this further step (d), one or more ethylenically unsaturated monomers are polymerized in the aqueous solution obtained at step (b) or (c) thereby forming an aqueous dispersion of a polymer V. These monomers are polymerized by emulsion polymerization, typically in presence of a radical initiator.

The obtained reaction products $ZYW_SV$ or $ZYW_SXV$ are typically simple mixtures of the polymer V, stabilized by the emulsifier polymer $ZYW_S$ or $ZYW_SX$. Most typically, the obtained polymer dispersion particles show a core/shell structure with the polymer V forming the "core domain", surrounded by the emulsifier polymer $ZYW_S$ or $ZYW_SX$, forming the "shell domain".

Emulsion polymerizations of ethylenically unsaturated monomers are known to the skilled person. They are usually distinguished by the fact that radical polymerization of ethylenically unsaturated monomers is carried out in the aqueous phase and in the presence of radical initiators and emulsifiers. In the present case, compound $ZYW_S$ or $ZYW_SX$ plays the role of the emulsifier.

Examples of suitable monomers for the preparation of the copolymer V at step (d) include styrenic derivatives such as styrene, vinyltoluene, alpha-methylstyrene, ethylstyrene, isopropylstyrene, tert-butylstyrene, 2,4-dimethylstyrene, diethylstyrene, o-methyl-isopropylstyrene, chlorostyrene, fluorostyrene, iodostyrene, bromostyrene, 2,4-cyanostyrene, hydroxystyrene, nitrostyrene, phenylstyrene.

Further suitable monomers also include esters of (meth)acrylic or crotonic acid with saturated linear or cyclic alcohols containing 1 to 20, more preferably from 1 to 14, carbons on the alkyl or cyclic group. Examples include but are not limited to alkyl(meth)acrylates such as methyl (meth)acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, nonyl (meth)acrylate, decyl (meth)acrylate, undecyl (meth)acrylate, dodecyl (meth)acrylate, tridecyl (meth)acrylate, tetradecyl (meth)acrylate and isobornyl (meth)acrylate. Suitable monomers can also be selected from heterocyclic (meth)acrylates like for instance tetrahydrofurfuryl (meth)acrylate, from functionalized (meth)acrylates such as epoxy-functional (meth)acrylates, especially glycidyl (meth)acrylate, and hydroxyl-functionalized (meth)acrylates, such as hydroxyalkyl (meth)acrylates. Some nonlimiting examples are hydroxymethyl (meth)acrylate, hydroxyethyl (meth)acrylate, hydroxypropyl (meth)acrylate, hydroxybutyl (meth)acrylate, hydroxypentyl(meth)acrylate, hydroxyhexyl (meth)acrylate hydroxyheptyl (meth)acrylate, hydroxyoctyl (meth)acrylate, hydroxynonyl (meth)acrylate, hydroxydecyl (meth)acrylate, hydroxyundecyl (meth)acrylate, hydroxydodecyl (meth)acrylate, hydroxytridecyl (meth)acrylate, hydroxytetradecyl (meth)acrylate. Amino functionalized monomers can also be used, one non-limiting example being N,N-dimethylaminoethyl (meth)acrylate.

Further usable monomers include (meth)acrylamide, vinyl acetate, (meth)acrylonitrile, N-vinylformamide, N-vinylpyrrolidone, N-butoxymethyl (meth)acrylamide, N-methylol (meth)acrylamide and monomers that contain besides a polymerizable group such as a vinyl or (meth)acryl group also a keto group, such as diacetone (meth)acrylamide, or an aceto acetoxy group such as in acetoaecetoxyethylmethacrylate Mixtures of any of the listed monomers can also be used.
Preferably, at least one of said monomers is a (meth)acrylate, a styrenic monomer, an acrylamide monomer or a vinyl carboxylate. More preferably, the one or more monomers are (meth)acrylate monomers, styrenic monomers, acrylamide monomers, vinyl carboxylate monomers or a combination thereof. Preferably at least one of said monomers is a (meth)acrylate, a styrenic monomer, an acrylamide monomer or a vinyl carboxylate.

Examples of preferred ethylenically unsaturated monomers used to prepare the polymer V at step (d) are styrenic monomers such as styrene, vinyltoluene, alpha-methylstyrene, ethylstyrene; acrylamides such as, acrylamide, methacrylamide; alkyl(meth)acrylates containing from 1 to 20, preferably from 1 to 14, carbons in the alkyl group such as, methyl (meth)acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, nonyl (meth)acrylate, decyl (meth)acrylate, undecyl (meth)acrylate, dodecyl (meth)acrylate, tridecyl (meth)acrylate, tetradecyl (meth)acrylate; heterocyclic (meth)acrylate like for instance tetrahydrofurfuryl (meth)acrylate, isobornyl (meth)acrylate; functionalized (meth)acrylates such as epoxy-functional (meth)acrylates, especially glycidyl (meth)acrylate, and hydroxyl-functionalized (meth)acrylates, such as hydroxyalkyl hydroxyalkyl (meth)acrylates such as hydroxymethyl (meth)acrylate, hydroxyethyl (meth)acrylate, hydroxypropyl (meth)acrylate, hydroxybutyl (meth)acrylate, hydroxypentyl(meth)acrylate, hydroxyhexyl (meth)acrylate hydroxyheptyl (meth)acrylate, hydroxyoctyl (meth)acrylate, hydroxynonyl (meth)acrylate, hydroxydecyl (meth)acrylate, hydroxyundecyl (meth)acrylate, hydroxydodecyl (meth)acrylate, hydroxytridecyl (meth)acrylate, hydroxytetradecyl (meth)acrylate and vinyl acetate. Mixtures of any of these monomers can also be used.

The most preferred monomers for the preparation of polymer V are styrene, vinyltoluene, alpha-methylstyrene, ethylstyrene, methyl (meth)acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, glycidyl (meth)acrylate, hydroxymethyl (meth)acrylate, hydroxyethyl (meth)acrylate, hydroxypropyl (meth)acrylate, hydroxybutyl (meth)acrylate, diacetone (meth)acrylamide, acetoacetoxyethyl (meth)acrylate and mixtures thereof.

Also poly functional monomers, such as di(meth)acrylates and divinyl monomers can be used as small amounts in the preparation of polymer V, including functionalized di(meth)acrylates such as glycerol di(meth)acrylate. Preferably, at most 3 wt % of the monomers used are monomers having two or more ethylenic unsaturations.

The monomers usable for the preparation of copolymer V preferably do not contain large amounts of ethylenically unsaturated monomers bearing an acid group or group capable of forming an acid group when contacted with water. Preferably, at most 5 wt % of the monomers used are monomers having an acid group (e.g. —COOH or —SO$_3$H) or a group capable of forming an acid group when contacted with water.

The types and amounts of monomers usable for the preparation of polymer V are preferably chosen so that copolymer V is hydrophobic. Hence, particularly preferred monomers have a low solubility in water, preferably less than 15%, more preferably less than 5%, and most preferably less than 3%. The solubility in water is measured at 25° C., as a percentage of grams of dissolved monomers per 100 grams of water.

The monomer mixtures used for the preparation of copolymers V preferably contain at least 15 wt %, more preferably at least 25 wt %, of monomers having a glass transition temperature (Tg) of their homopolymerisate of at least 50° C., based on the total of monomers used in step d. The monomer mixtures preferably do not contain more than 90 wt %, more preferably not more than 80 wt %, of monomers having a glass transition temperature (Tg) of their homopolymerisate of at least 50° C., based on the total of monomers used in step d. Particularly, and especially when used in a formulation without other binder resins, the monomer mixtures most preferably do not contain more than 70 wt % of monomers having a glass transition temperature (Tg) of at least 50° C., based on the total amount of monomers used in step d. In the present invention, the glass transition temperature (Tg) of polymer is determined according to DIN EN 61006.

Preferably the process is performed with the at least partially protonated compound $ZYW_S$ or $ZYW_SX$ as the sole emulsifier. When the partially or totally protonated adduct $ZYW_S$ or $ZYW_SX$ of the invention is used in the emulsion polymerization, the good emulsifying power of this adduct advantageously makes the presence of additional emulsifiers unnecessary.

If an additional emulsifier is nevertheless used, it may be non-ionic such as alkyl or alkyl phenol ethoxylated derivatives, anionic such as salts of alkyl sulfates, phosphates or sulfonates or cationic such as quaternary ammonium salts of alkyl amines.

The amount of $ZYW_S$ or $ZYW_SX$ in the dispersion preferably is at least 12 wt %, more preferably at least 15 wt % and it does not exceed preferably 37 wt %, more preferably 35 wt % based on the sum of $ZYW_S$ or $ZYW_SX$) and V.

The aqueous dispersion according to the invention preferably comprises:
from 10 wt % to 40 wt % of at least partially protonated adduct $ZYW_S$ and/or $ZYW_SX$, and
from 60 wt % to 90 wt % of polymer V,
based on the sum of $ZYW_S$ (and/or $ZYW_SX$) and V.

Typically, the amount of polymer V represent from 50 wt % to 95 wt %, preferably from 60 wt % to 90 wt %, most preferably from 65 wt % to 80 wt % of the sum of the amount of polymer V and at least partially converted adduct $ZYW_S$ or $ZYW_SX$. The components mentioned can be introduced into the emulsion polymerization process in various ways.

The amount of polymer V in the dispersion preferably is at least 63 wt %, more preferably at least 65 wt % and it does not exceed preferably 88 wt %, more preferably 85 wt % based on the sum of $ZYW_S$ (or $ZYW_SX$) and V.

The aqueous dispersion obtained at step (d) has typically a pH of at least 4.0, preferably at least 4.5 and more preferably at least 5.0. The pH generally does not exceed 7.0, preferably 6.5 and more preferably 6.0.

Typically, the major portion of the aqueous phase is introduced at the beginning and portions of water can be further added during the reaction in different ways such as in the form of a radical initiator solution or a monomer pre-emulsion.

Step (d) can be carried out over a broad temperature range. Typically, the polymerizing step is performed at a temperature of 30° C. or more. Also typical is performing the polymerizing step at a temperature of 99° C. or less. During the polymerization (step d), the reaction temperature usually ranges from 30 to 99° C. It can be maintained constant or can be varied during step (d).

The radical initiator is usually added to the solution in the pure form or in an aqueous solution at once, or continuously or incrementally over the reaction time.

Suitable initiators are typically thermal radical-forming compounds like azo compounds such as 2,2'-azobis(isobutylonitrile). Particularly preferred are water soluble azo compounds such as 2,2'-Azobis(2-amidinopropane) dihydrochloride and the like. Other suitable initiators are redox systems. Examples of suitable redox systems are cumene hydroperoxide/sodium metabisulphite, hydrogen peroxide/ascorbic acid and tert-butyl hydroperoxide/ascorbic acid. Other suitable initiators can also be used. "Anionic" initiator systems like ammonium or potassium persulfates are not preferred as anionically charged initiator systems might negatively interfere with the cationic emulsifier polymer $ZYW_3(X)$, resulting in reduced monomer conversion. The initiators are generally used in amounts between 0.01 and 5.0 wt % relative to the solution. The amount used is preferably from 0.01 to 2.0 wt %.

After addition of at least a portion of the radical initiator, the monomer mixture of step (d) can be introduced in pure form or as a pre-emulsion in water. Alternatively, the radical initiator can be added to the monomer mixture. An advantage of the process according to the present invention is that it enables a very easy and fast emulsion polymerization reaction, without the need of any pre-emulsion step for monomers, as it is the case in most other synthetic routes using additional surfactants. The one or more monomers are preferably introduced in the aqueous solution in a non-pre-emulsified form. More preferably, the monomer mixture of step (d) may be introduced in pure form. The one or more monomers can be introduced in its entirety or continuously or incrementally during the emulsion polymerization. The one or more monomers may for instance be introduced over a period of at least one hour. The one or more monomers may for instance be introduced over a period of at most eight hours. They are preferably introduced over a period of 1 to 8 hours, preferably over a period of 2 to 6 hours.

In a particular embodiment of the invention, it is possible to add different monomers or monomer mixtures in sequences. Using this approach, the polymer V (here a copolymer) can be designed to have multi-domain structures, which may show multiple transition temperatures Tg.

In a specific variant of this embodiment, at least two different monomers or monomer mixtures are added sequentially to prepare copolymer V and the obtained copolymer V has at least two Tg. For instance a copolymer V may be prepared with a first monomer/monomers mixture having a Tg after copolymerization above 60° C. and a second monomer/monomers mixture having a Tg after copolymerization below 15° C. Such dispersions enable to obtain films having high film hardness while excellent film formation is still observed without the need of additional coalescing agents.

The polymerization usually proceeds until the residual monomer content is lower than 1 wt %, preferably lower than 0.5 wt %, more preferably lower than 0.1 wt % with respect to the total weight of monomers used. The residual monomer content is determined according to DIN 55682: 2000-12.

An optional post-initiation can be performed in case the amount of residual monomers is higher than 1 wt % after 8 hours of reaction. It is typically performed by addition of an additional portion of radical initiator or redox-initiator system to ensure a residual monomer content lower than 1 wt %, preferably lower than 0.5 wt %, more preferably lower than 0.1 wt %.

The aqueous dispersion obtained after step (d) according to embodiments of the present invention is usually further characterized by a solid content of from 30 to 50 wt %, preferably from 35 to 45 wt %, as determined according to DIN 55671:2002-09.

The aqueous dispersions obtained after step (d) according to embodiments of the present invention may typically have an acid value determined on the solid content of at least 15 mg KOH/g, preferably at least 25 mg KOH/g. The acid value typically does not exceed 50 mg KOH/g, preferably 35 mg KOH/g. It can be measured according to the standard method DIN EN ISO 2114:2002-06.

The dynamic viscosity of the aqueous dispersions obtained after step (d) according to embodiments of the present invention typically ranges from 50 to 10000, preferably from 50 to 5000, mPa·s at 23° C. and a shear rate of 25 s$^{-1}$, according to DIN EN ISO 3219:1994-10. Particularly preferred are aqueous dispersions having a viscosity in the range of 100 to 2000 mPa·s.

In general, it is believed that the particles of the dispersion comprise an inner domain optionally substantially formed by the polymer V and an outer domain optionally substantially formed by the adduct $ZYW_S$ or $ZYW_SX$. The outer domain is located at and/or towards the surface of the particles and may form a continuous or one or more discrete domains on the outer surface of the inner domain.

It is believed that the emulsifying properties of the partially or totally protonated adduct $ZYW_S$ and $ZYW_S(X)$ allows the preparation of aqueous dispersions comprising a polymer V that are stable without the need of the addition of an external surfactant. By stable is meant that no noticeable precipitation, sedimentation or coagulation is observed when the aqueous dispersion is stored for at least 3 months at a temperature of 40° C. Hence, the compositions according to the invention are preferably substantially free of additional surfactant. By substantially free is meant that the composition comprises less than 2 wt % on the solid content of external surfactant, preferably less than 1 wt %, more preferably less than 0.5 wt %, most preferably less than 0.1 wt %, or no detectable additional surfactant at all.

Various additives and compounds that are known to those skilled in the art may also be added to the aqueous dispersions according to the invention. Those additives and compounds include but are not limited to fungicides, bactericides, pigments and extenders, active and/or inactive fillers, thickeners, substrate wetting agents, driers, organic and/or inorganic solvents, buffers, coalescing agents, defoamers, pigments, leveling additives, oils, waxes and the like.

The aqueous dispersions according to the invention are suitable as coating agents or binder agents in general. The aqueous dispersions according to the invention may be used as single binders. They also may be used in blends with at least one other binder. By "other" is meant herein a binder different from the aqueous dispersion according to the invention, including aqueous and non-aqueous binders. Binders that are compatible with the dispersion of the invention are preferred. By "compatible" is meant that no noticeable precipitation, sedimentation or coagulation is observed when the blend is stored for at least 3 months at a temperature of 40° C. Particularly preferred binders are aqueous binders. Examples include but are not limited to blends with alkyd resins, acrylic resins, polyurethane resins, epoxy resins, oils, waxes and the like, other examples include hybrid of the listed resins such as for instance acrylic-alkyd hybrid resins, acrylic-polyurethane hybrid resins, alkyd-polyurethane hybrid resins. Preferred blends are blends with alkyd resins, epoxy resins or polyurethane dispersions.

The aqueous dispersions according to the invention may be used on various substrates. Examples of possible substrates include but are not limited to wood, wood fibre, cellulose, polymeric substrates such as polystyrene, polyolefins, polyesters, polyamides, polyurethanes, polycarbonates and the like, inorganic substrates like metal (e.g. steel) and pre-treated metal substrates (e.g. coated metal such as CED pre-coated steel), concrete, glass and silicates in general.

The aqueous dispersions according to the invention may be applied to the substrates by various techniques known to those skilled in the art. Those techniques include but are not limited to brushing, spraying, dipping, pouring, draining, electro-deposition, roller coating and the like. The drying of formulations containing the aqueous dispersions according to the invention may either happen at ambient temperature or at forced conditions like elevated temperature and/or reduced pressure for a variable time.

The aqueous dispersions according to the invention are particularly suitable for wood stain, wood trim and stain blocking applications. In particular, the dispersions according to the invention are particularly suitable for entering the composition of stain-blocking coatings (e.g. stain-blocking primers) where they provide them with excellent tannin-blocking, marker-blocking, freeze-thaw-resistance, UV-resistance, water-resistance, cold check resistance and external durability. Furthermore, the compositions according to the invention tend to promote the adhesion of primer or coating compositions in which they are incorporated. In particular, when added to a two component epoxy system, the adhesion of the system is markedly improved, in particular on hard to coat substrates such as CED pre-coated steel plates. The enhanced adhesion characteristics may also be advantageous for various other organic and/or inorganic substrates like polymeric, concrete or glass substrates.

In a second aspect, the present invention relates to a process for the preparation of an aqueous dispersion. The features of the process are as described above in the first aspect.

The present invention further relates to the use of an aqueous dispersion according to any embodiment of the present invention for promoting the substrate adhesion properties of a composition. In an embodiment, the present invention relates to the use of an aqueous dispersion according to any embodiment of the present invention for promoting the adhesion of a composition to a CED coating such as a CED coating on a steel substrate.

The present invention further relates to a process for preparing a coated substrate or article, wherein at least part of the surface of the substrate or article is coated with an aqueous dispersion according to any embodiment of the invention. In a further aspect, the invention finally relates to the coated substrates or articles hereby obtained.

The examples which follow illustrate embodiments of the invention without limiting it.

In these examples, the solid contents of the aqueous dispersions were determined according to DIN 55671:2002-09. The amine values were determined according to DIN 53176:2002-11. The acid values were measured according to the standard method DIN EN ISO 2114:2002-06

The types and amounts of reagents used to prepare polymers of examples 1 and 2 and comparative example 3 are summarized in Table 1.

PREPARATION OF EMULSIFIER POLYMERS $ZYW_S$ (EXAMPLE 1)

In a 4-necked round glass reactor 214.0 g (1.0 mole) of Coconut oil fatty acid ($W_S$), 306.6 g (3.0 mole) of dimethylaminopropyl amine (Y1) and 105.1 g (1.0 mole) of diethanol amine (Y2) were mixed upon stirring and heated to 60° C. Then 1520 g (4.0 mole) of bisphenol-A-diglycidyl ether (BADGE; Z) were continuously added over 60 minutes to the reaction mixture. Due to the exothermic nature of the reaction, the reaction temperature gradually rose to 160° C. during the addition of the epoxide. The resulting reaction mixture was stirred for one additional hour at 160° C. Then the viscous reaction product was poured into a pre-mixed solution of 220 g aqueous formic acid (85%) in 5000 g de-ionized water and further stirred at 70° C. until a clear, transparent, brownish aqueous solution of the emulsifier polymer $ZYW_S$ was obtained. Finally, the resulting reaction product was adjusted to an overall solids content of 25.1% by the addition of de-ionized water.

PREPARATION OF EMULSIFIER POLYMERS $ZYW_SX$ (EXAMPLE 2)

Example 1 was repeated except that before adjusting the reaction product to the overall solids content of 25.1%, an additional portion of 107.3 g (0.28 mole) bisphenol-A-diglycidyl ether (BADGE; X) was added to this aqueous solution in one shot and stirred for 3 to 5 hours at 70° C. until full conversion of the epoxide was observed by titration. A transparent, clear, brownish aqueous solution of emulsifier polymer $ZYW_SX$ was obtained as reaction product. Finally, the resulting reaction product was adjusted to an overall solids content of 25.1% by the addition of de-ionized water.

PREPARATION OF EMULSIFIER POLYMERS ZYWX (COMPARATIVE EXAMPLE 3)

Example 2 was repeated except that 280.0 g (1.00 mole) of tall oil fatty acid was used instead of the 214.0 g (1.00 mole) coconut oil fatty acid.

The types and amounts of reagents used to prepare polymers of examples 1 and 2 and comparative example 3 are summarized in Table 1.

Characteristics of polymers of examples 1 and 2 and comparative example 3 are summarized in Table 1 and are obtained according to the test methods described in the specification.

The types and amounts of reagents used to prepare final dispersions of examples 4 and 5 and comparative example 6 are summarized in Table 2.

PREPARATION OF FINAL DISPERSIONS $ZYW_SV$ (EXAMPLE 4)

1505 g of Emulsifier Polymer solution obtained as reaction product of Example 1 and 660 g of de-ionized water were added to a 4-necked round glass reactor and heated to 65° C. upon stirring. Then 7.2 g of 2,2'-Azobis(2-amidinopropane) dihydrochloride (radical initiator; trade name: WAKO V-50) were added to the solution and dissolved for 10 minutes at 65° C. Then a homogeneous mixture of ethylenically unsaturated monomers consisting of 216 g 2-ethylhexyl acrylate, 216 g butyl acrylate, 36 g styrene and 372 g methyl methacrylate was continuously added over a period of 4 hours at 65° C. The reaction mixture was held for one additional hours at 65° C., followed by the addition of 1.2 g 2,2'-Azobis(2-amidinopropane) dihydrochloride (radical initiator; trade name: WAKO V-50) and 6 g methyl methacrylate for post-initiation. The reaction mixture was held for two additional hours at 70° C. before allowed to cool to ambient temperature, which yielded the final product $ZYW_SV$ as a yellowish aqueous dispersion. This dispersion proved to be perfectly storage stable for >3 months at 40° C.

PREPARATION OF FINAL DISPERSIONS $ZYW_SXV$ (EXAMPLE 5)

Example 4 was repeated but the reaction product of Example 2 was used instead of the reaction product of Example 1 to yield as a final product, $ZYW_SXV$ as a yellowish aqueous dispersion. This dispersion proved to be perfectly storage stable for >3 months at 40° C.

PREPARATION OF FINAL DISPERSIONS ZYWXV (COMPARATIVE EXAMPLE 6)

Example 4 was repeated but the reaction product of Comp. Example 3 was used instead of the reaction product of Example 1 to yield as a final product, ZYWXV as a yellowish aqueous dispersion.

TABLE 1

Composition (g) of Polymers 1, 2 and Comparative Polymer 3:

| Component | Example 1 | Example 2 | Comp. Example 3 |
|---|---|---|---|
| Coconut oil fatty acid (Ws) | 214.0 g (1.0 mole) | 214.0 g (1.00 mole) | — |
| Tall oil fatty acid (W) | — | — | 280.0 g (1.00 mole) |
| Dimethylaminopropyl amine (Y1) | 306.6 g (3.0 mole) | 306.6 g (3.00 mole) | 306.6 g (3.00 mole) |
| Diethanol amine (Y2) | 105.1 g (1.0 mole) | 105.1 g (1.00 mole) | 105.1 g (1.00 mole) |
| BADGE (Z) | 1520.0 g (4.00 mole) | 1520.0 g (4.00 mole) | 1520.0 g (4.00 mole) |
| Deionized $H_2O$ (in total) | 6183 g | 6500 g | 6700 g |
| Aqueous formic acid (85%) | 220 g (4.06 mole) | 220 g (4.06 mole) | 220 g (4.06 mole) |
| BADGE (X) | — | 107.3 g (0.28 mole) | 107.3 g (0.28 mole) |
| Solids content % | 25.1% | 25.1% | 25.1% |
| Amine value (mg KOH/g solids) | 183 | 174 | 170 |
| Acid value (mg KOH/g solids) | 108 | 94 | 93 |
| pH | 5.4 | 5.4 | 5.3 |

Characteristics of final dispersions of examples 4 and 5 and comparative example 6 are summarized in Table 2 and are obtained according to the test methods described in the specification.

TABLE 2

Composition (g) of Examples 4, 5 and Comparative Example 6:

| Component | Example 4 | Example 5 | Comp. Example 6 |
|---|---|---|---|
| Emulsifier Polymer Example 1 | 1505 g (377.8 g solids) | | |
| Emulsifier Polymer Example 2 | | 1505 g (377.8 g solids) | |
| Emulsifier Polymer Comp. Example 3 | | | 1505 g (377.8 g solids) |
| Deionized water | 660 g | 660 g | 660 g |
| WAKO V-50 | 7.2 g | 7.2 g | 7.2 g |
| 2-Ethylhexyl acrylate | 216 g | 216 g | 216 g |
| Butyl acrylate | 216 g | 216 g | 216 g |
| Styrene | 36 g | 36 g | 36 g |
| Methyl methacrylate | 372 g | 372 g | 372 g |
| WAKO V-50 | 1.2 g | 1.2 g | 1.2 g |
| Methyl methacrylate | 6.0 g | 6.0 g | 6.0 g |
| Solids content % | 40.0% | 40.2% | 39.5% |
| Dynamic viscosity (mPas; 23° C.; 25 1/s) | 159 mPas | 246 mPas | 10320 mPas |
| Amine value (mg KOH/g solids) | 55 | 53 | 51 |
| Acid value (mg KOH/g solids) | 33 | 30 | 30 |
| Particle size average (nm) | 61 nm | 61 nm | 63 nm |
| Overall residual monomer content (%) | 0.06% | 0.08% | 0.65% |
| pH | 5.4 | 5.3 | 5.3 |

From table 2, it can be concluded that at 40% solids content the dispersions 4 and 5 of the present invention show a dynamic viscosity level in the range 100-300 mPas (measured at a shear rate of 25 s$^{-1}$ @ 23° C.), which proves to be excellent for further handling and formulation. Residual monomer levels (combined amount of residual monomers) are found to be below 0.1% for Examples 4 and 5. Those facts represent a clear advantage over Comparative Example 6 which is analog to the prior art published in U.S. Pat. No. 6,653,370 B2. Comparative Example 6 uses unsaturated fatty acids for the reparation of the emulsifier polymer, as it was done in U.S. Pat. No. 6,653,370 B2. Comparing the residual monomer levels of Example 4 and 5 (<0.1%) to the residual monomer levels of Comparative Example 6 (>0.6%) which contains unsaturated fatty acid moieties shows a strong effect which can be attributed to the presence of unsaturated fatty acids in Example 6.

Without being bound by theory, it is hypothesized that the presence of unsaturated fatty acids during radical initiated emulsion polymerization reactions leads to the formation of stabilized fatty acid radicals by radical transfer from growing polymer chains to the unsaturated fatty acid moieties. This radical transfer terminates the growing polymer chains, which leads to incomplete conversion of ethylenically unsaturated monomers, which leads to higher residual monomer levels in the final products (this might cause some VOC and regulatory issues for the final product in certain applications).

Furthermore, Comparative Example 6 shows a very high dynamic viscosity of >10000 mPas (shear rate of 25 s-1 @ 23° C.) at an overall solids content of <40%. It has surprisingly been found that replacing the unsaturated tall oil fatty acid (used in Comparative Example 6 and in U.S. Pat. No. 6,653,370 B2) by a saturated fatty acid (coconut oil fatty acid; Example 5) leads to a huge decrease in dynamic viscosity while long term storage stability (>3 months @ 40° C.) is not negatively affected. This finding represents a clear advantage over the prior art as higher solid contents for the dispersions according to the invention are possible while still keeping the dynamic viscosity in a reasonable and workable range for formulation and further processing. Example 5, which uses saturated fatty acids, displays a dynamic viscosity of <300 (shear rate of 25 s-1 @ 23° C.) at an overall solids content of >40%.

Although Example 4 of prior art U.S. Pat. No. 6,653,370 B2 only exhibits 120 mPas (shear rate 100 s-1 @ 23° C.) at a solid content of 39.7% despite the fact that unsaturated fatty acids (tall oil fatty acids) are used, it was observed that in this case, the low viscosity can only be achieved by addition of >3.5% butyl glycol as solvent. The use of saturated fatty acids as outlined in the present invention eliminates the need of additional organic solvents to bring down the dynamic viscosity. This represents a clear advantage over the prior art with respect to VOC regulations and eco-friendliness.

EXAMPLE 7: PREPARATION AND EVALUATION OF THE PROPERTIES OF A STAIN-BLOCKING PRIMER PREPARED FROM AQUEOUS DISPERSION ACCORDING TO THE PRESENT INVENTION 7.1. Formulation of a Primer For evaluating the tannin- and marker blocking performance of the hybrid resins according to the invention the following primer formulations have been prepared as follow:

1. In a first step a mill base has been prepared according to the following formulation:

TABLE 3

Composition of Mill Base 1:

| Amount [g] | Substance |
|---|---|
| 18.93 g | De-ionized water |
| 8.71 g | ADDITOL ® VXW 6208 (dispersing additive) |
| 15.44 g | ASP 600 (extender) |
| 40.08 g | KRONOS ® 2059 (pigment) |
| 14.20 g | Blanc Fixe micro (extender) |
| 2.64 g | ADDITOL ® VXW 6386 (defoamer) |
| 100 g | |

The components of Mill Base 1 were mixed and grinded in a pearl mill containing glass beads of 1.5 mm for 30 minutes at approx. 3000 rpm.

2. In a second step the mill base was blended with the respective binder resins to yield the final stain-blocking primers:

TABLE 4

Composition of Stain Blocking Primers 1 to 3:

| Component | Stain Blocking Primer 1 | Stain Blocking Primer 2 | Stain Blocking Primer 3 |
|---|---|---|---|
| Mill Base 1 | 50 g | 50 g | 50 g |
| Example 4 | — | 43.57 g (17.43 g solids) | — |

TABLE 4-continued

Composition of Stain Blocking Primers 1 to 3:

| Component | Stain Blocking Primer 1 | Stain Blocking Primer 2 | Stain Blocking Primer 3 |
|---|---|---|---|
| Example 5 | — | — | 43.36 g (17.43 g solids) |
| DUROXYN ® EF 2107w/45WA | 38.73 g (17.43 g solids) | — | — |
| Deionized water | Amount adjusted to yield 55% overall solids content | | |

The components of Stain Blocking Primers 1 to 3 were blended and mixed upon stirring at ambient temperature to yield the respective stain blocking primers.

Stain Blocking Primer 1 is based on the commercial cationic 1K-epoxy stain-blocking resin DUROXYN® EF 2107w/45WA. It serves as a 1K-epoxy based reference primer with known excellent tannin- and stain-blocking ability.

7.2. Top-Coat Formulation

For evaluating the tannin- and marker blocking performance of the hybrid resins according to the invention the following top-coat formulation has been used. This top-coat formulation has been evaluated to show insignificant tannin- and marker-blocking if used without stain-blocking primer (see also evaluations below). Therefore, it is used as reference top-coat with low blocking ability.

1. In a first step a mill base has been prepared according to the following formulation:

TABLE 5

Composition of Mill Base 2:

| Amount [g] | Substance |
|---|---|
| 17.10 g | De-ionized water |
| 3.60 g | ADDITOL ® VXW 6208 (dispersing additive) |
| 1.70 g | Propylene glycol |
| 0.80 g | ADDITOL ® VXW 6214 (slip and underground wetting agent) |
| 1.90 g | ADDITOL ® VXW 4973 (defoamer) |
| 69.30 g | Kronos 2310 (pigment) |
| 5.30 g | Acrysol RM 2020 (rheology modifier) |
| 0.30 g | Surfynol DF-66 (defoamer) |
| 100 g | |

The components of Mill Base 2 were mixed and grinded in a pearl mill containing glass beads of 1.5 mm for 30 minutes at approx. 3000 rpm.

2. In a second step the mill base was blended with other components to yield the final top-coat formulations:

TABLE 6

Composition of Top-Coat 1:

| Amount [g] | Substance |
|---|---|
| 57.30 g | RESYDROL ® VAY 6278w/45WA (binder resin) |
| 30.00 g | Mill Base 2 |
| 5.70 g | Ultralube E-359 (wax-emulsion) |
| 0.40 g | ADDITOL ® VXL 4930 (slip and leveling agent) |
| 6.60 g | De-ionized water |
| 100 g | |

The mill base was carefully mixed into the binder resin. Then the other components were added and mixed upon stirring at ambient temperature to yield the respective Top-Coat 1.

7.3. Evaluation of Tannin-Blocking Ability

For evaluating the tannin-blocking performance of the Stain Blocking Primers 1 to 3 a Merbau-wood board has been divided in 4 equal sections. On sections 1 to 3 the Stain Blocking Primers 1 to 3 have been applied in 100 μm wet film thickness using a standardized coating bar. On section 4 (control section) Top-Coat 1 has been applied in 100 μm wet film thickness using a standardized coating bar, serving as control area with less tannin blocking ability.

After drying of the first coat for 8 hours at ambient temperature, all sections have been top-coated with Top-Coat 1 in 100 μm wet film thickness using a standardized coating bar. After drying of the topcoat for 24 hours at ambient temperature the Merbau-wood board has been aged for 7 days at 40° C. and 90% relative humidity.

Finally, the tannin-blocking efficiency has been rated from 0-5 by observation with the human eye. Higher values indicate better tannin-blocking efficiency (0 . . . no tannin-blocking at all—very strong tannin-related discoloration of the top-coat layer; 5 . . . excellent tannin-blocking—no tannin-related discoloration of the top-coat layer).

The results of this observation have been summarized in the following table:

TABLE 7

Tannin-Blocking Efficiency on Merbau-wood:

| | Section 1 | Section 2 | Section 3 | Section 4 |
|---|---|---|---|---|
| $1^{st}$ coating layer (primer) | Stain Blocking Primer 1 | Stain Blocking Primer 2 | Stain Blocking Primer 3 | Top-Coat 1 |
| $2^{nd}$ coating layer (top-coat) | Top-Coat 1 | Top-Coat 1 | Top-Coat 1 | Top-Coat 1 |
| Tannin-blocking efficiency | 5 | 5 | 5 | 1 |

The tannin-blocking performance of the binder resins according to the invention (present in Stain Blocking Primer 2 and 3) was found to be comparable to the tannin blocking performance of the commercial stain-blocking resin DUROXYN® EF 2107w/45WA (present in Stain Blocking Primer 1). In case no stain-blocking primer was used and two layers of Top-Coat 1 were applied instead, no significant tannin-blocking was observed.

7.4 Evaluation of Marker-Blocking Ability

For evaluating the marker-blocking performance of the Stain Blocking Primers 1 to 3 a Leneta card has been coated with a commercial interior wall-paint (Behr Interior Flat-Ultra Pure White® 1050) in 100 μm wet film thickness using a standardized coating bar. After drying of the paint for 7 days at ambient temperature, continuous horizontal lines have been drawn on the painted area using different commercial text-markers of various colors:

RED Marks-A-lot Permanent
BLACK Marks-A-Lot Permanent
BLUE Gel pen Pilot G-2
BLACK Gel pen Pilot G-2
RED Gel pen Pilot G-2
GREEN Window Mega Marker
BLUE Window Mega Marker
PENCIL Bic No. 2

After application of the markers, the Laneta card has been stored at ambient temperature for at least 7 days prior to further usage. For testing of the marker-blocking efficiency, the Laneta card has been divided in 4 equal vertical sections, each of them showing the continuous horizontal marker lines. On sections 1 to 3 the Stain Blocking Primers 1 to 3 have been applied in 100 µm wet film thickness using a standardized coating bar. On section 4 (control section) Top-Coat 1 has been applied in 100 µm wet film thickness using a standardized coating bar, serving as control area with less marker-blocking ability. After drying of the first coat for 8 hours at ambient temperature, all sections have been top-coated with Top-Coat 1 in 100 µm wet film thickness using a standardized coating bar. After drying of the topcoat for 24 hours at ambient temperature the marker-blocking efficiency in its overall appearance has been rated from 0-5 by observation with the human eye. Higher values indicate better marker-blocking efficiency (0 . . . no marker-blocking at all—very strong marker-related discoloration of the top-coat layer; 5 . . . excellent marker-blocking—no marker-related discoloration of the top-coat layer).

The results of this observation have been summarized in the following table:

TABLE 8

| Marker-Blocking Efficiency on marked Laneta Card: | | | | |
|---|---|---|---|---|
| | Section 1 | Section 2 | Section 3 | Section 4 |
| 1$^{st}$ coating layer (primer) | Stain Blocking Primer 1 | Stain Blocking Primer 2 | Stain Blocking Primer 3 | Top-Coat 1 |
| 2$^{nd}$ coating layer (top-coat) | Top-Coat 1 | Top-Coat 1 | Top-Coat 1 | Top-Coat 1 |
| Marker-blocking efficiency (overall appearance rating) | 4 | 4 | 5 | 1 |

The marker-blocking performance of the binder resins according to the invention (present in Stain Blocking Primer 2 and 3) was found to be comparable to the marker blocking performance of the commercial stain-blocking resin DUROXYN® EF 2107w/45WA (present in Stain Blocking Primer 1). In case no stain blocking primer was used and two layers of Top-Coat 1 were applied instead, no significant marker blocking was observed.

7.5 Evaluation of Cold Check Resistance

For evaluating the cold check performance of the Stain Blocking Primers 1 to 3 a standard US pine-wood board has been coated on one side with the respective Stain Blocking Primers 1 to 3 using a brush. After 8 hours of drying at ambient temperature half of the coated area has been top-coated with Top-Coat 1.

After drying of the pine wood board for 7 days at ambient temperature and humidity, the test specimen has been subjected to the following cyclic test for 10 repeated cycles:

Cold Check Testing Cycle:
1. QUV-A exposure of the coated side of the board for 24 hours according to DIN EN ISO 4892-3/cycle 1
2. Water immersion of the coated side of the board for 6 hours at 23° C. in tab-water
3. Immediate freezing of the water soaked board at −18° C. for 16 hours
4. 2 hours of thawing at 23° C. and ambient relative humidity
5. Repeat steps 1 to 4 for 10 times This cyclic test is meant to mimic the freeze-thaw-resistance of a coating in outdoor weathering conditions, including UV exposure and water soaking. The results of this cyclic test are summarized in the following table.

TABLE 9

| Cold check testing results: | | | |
|---|---|---|---|
| | Pine Board 1 | Pine Board 2 | Pine Board 3 |
| 1$^{st}$ coating layer (one side of the board; full board area) | Stain Blocking Primer 1 | Stain Blocking Primer 2 | Stain Blocking Primer 3 |
| 2$^{nd}$ coating layer (on top of 1$^{st}$ coating layer; half board area) | Top-Coat 1 | Top-Coat 1 | Top-Coat 1 |
| Observations during cyclic cold check testing | Severe cracking of primer layer after 3$^{rd}$ cycle; Flaking and peeling of primer layer and cracking of top-coated area after 5$^{th}$ cycle; Testing discontinued after 5$^{th}$ cycle | No cracking, blistering. flaking or peeling of the primer layer or the top-coated area observed after completion of 10 cycles | No cracking. blistering. flaking or peeling of the primer layer or the top-coated area observed after completion of 10 cycles |

The cold check testing performance of the binder resins according to the invention (present in Stain Blocking Primer 2 and 3) was found to be superior to the cold check testing performance of the commercial 1K-epoxy stain-blocking resin DUROXYN® EF 2107w/45WA (present in Stain Blocking Primer 1). Those testing results indicate that the binder resins according to the present invention are superior to state-of-the art 1K-epoxy based systems in terms of cold check resistance and may show enhanced external durability, especially in cold and wet climates.

7.6 Evaluation of Adhesion Promotion

Surprisingly, it has been found that the Epoxy/amino/fatty acid/acrylic hybrid resins according to the present invention show a significant adhesion-promotion effect when added to waterborne 2K-epoxy systems. This adhesion promotion effect especially becomes very obvious on hard-to-adhere substrates for 2K-epoxy systems, e.g. CED pre-coated steel plates.

Typical levels of addition for the binder resins according to the present invention are found in the range of 1%-20% of the combined amount of epoxy resin and epoxy hardener, based on the solid content of all components.

For evaluating the adhesion promotion performance of the binder resins according to the present invention, the following 2K-epoxy monocoat formulations have been prepared. 2K-Epoxy Formulation 2 contains Example 5 as adhesion promotion additive (8.4% of combined amount of epoxy resin and epoxy hardener based on solid content of all components).

TABLE 10

Composition of 2K-Epoxy Formulations 1 and 2:

| Part | Component | 2K-Epoxy Formulation 1 | 2K-Epoxy Formulation 2 |
|---|---|---|---|
| 1 | De-ionized water | 15.81 g | 15.81 g |
|   | ADDITIOL ® VXW 6208/60 (wetting- and dispersing agent) | 3.53 g | 3.53 g |
|   | ADDITOL ® VXW 6393 (defoamer) | 0.30 g | 0.30 g |
| 2 | Silitin Z86 (extender) | 6.83 g | 6.83 g |
|   | Printex U (carbon black pigment) | 0.46 g | 0.46 g |
|   | Bayferrox 306 (iron oxide black pigment) | 23.07 g | 23.07 g |
|   | Heucorin FR (flash rust inhibitor) | 1.45 g | 1.45 g |
|   | EWO | 21.34 g | 21.34 g |
| 3 | ADDITOL ® VXW 6393 (defoamer) | 0.20 g | 0.20 g |
|   | Texanol (coalescing agent) | 0.66 g | 0.66 g |
| 4 | ADDITOL ® VXW 6388 (thickener) | 0.50 g | 0.50 g |
|   | ADDITOL ® VXW 6503N (substrate wetting agent) | 0.33 g | 0.33 g |
| 5 | BECKOCURE ® EH 2260w/41WA (epoxy hardener) | 30.60 g | 30.60 g |
|   | Example 5 (adhesion promoter) | — | 7.17 g |
| 6 | BECKOPDX ® EP 2384w/57WA (epoxy resin) | 38.28 g | 38.28 g |
|   |   | 143.36 g | 150.53 g |

Parts 1 and 2 of the formulation have been pre-mixed on a dissolver, followed by grinding in a pearl mill containing glass beads of 1.5 mm for 30 minutes at approximately 3000 rpm. Then, parts 3 and 4 were added to this mixture and mixed-in upon stirring. Finally, the components of part 5 were added in the given order and mixed-in upon stirring at ambient temperature. The epoxy resin (part 6) was added to the formulation at the very end—immediately before application—and blended by stirring at ambient temperature.

The 2K-Epoxy Formulations 1 and 2 have been applied on a steel plate (GARDOBOND 265/6800/00) which has been pre-coated and cured with a standard automotive CED-resin in a dry film thickness of 25-30 μm. The adhesion properties of the 2K-Epoxy Formulations 1 and 2 to the standard automotive CED-resin have been evaluated after 1 week of drying at 23° C. and 50% relative humidity according to DIN EN ISO 2409:2013.

Adhesion testing of 2K-Epoxy Formulation 1 according to DIN EN ISO 2409 resulted in a total loss of adhesion (adhesion rating: 5) of the 2K-Epoxy monocoat.

Adhesion testing of 2K-Epoxy Formulation 2 (containing Example 5 as adhesion promoter) according to DIN EN ISO 2409 resulted in very good adhesion properties to the pre-coated, cured standard automotive CED-resin (adhesion rating: 1).

Surprisingly, it has been found that the Epoxy/amino/fatty acid/acrylic hybrid resins according to the present invention show a significant adhesion-promotion effect when added to waterborne 2K-epoxy systems. Adhesion promoting effects for other resin technologies and substrates are also likely to be observed.

The invention claimed is:

1. An aqueous dispersion comprising:
at least one fatty acid-modified epoxy amine adduct $ZYW_S$ containing amino groups which are at least partially protonated, wherein the fatty acid $W_S$ of the at least one fatty acid-modified epoxy amine adduct $ZYW_S$ is a fatty acid that contains at least 8 carbon atoms and has an iodine number according to DIN 53241-1:1995-05 of lower than 30, and the fatty acid $W_S$ of the at least one fatty acid-modified epoxy amine adduct $ZYW_S$ is bound to the epoxy amine adduct through a hydroxyl ester link, and
at least one polymer V obtained from the polymerization of one or more ethylenically unsaturated monomers, said at least one polymer V being hydrophobic.

2. The aqueous dispersion according to claim 1, wherein the at least one fatty acid-modified epoxy amine adduct $ZYW_S$ comprises a chain extended product $(ZYW_SX)$ obtained from the reaction of:
an aqueous solution of a fatty acid-modified epoxy amine adduct $ZYW_S$ emulsion polymer, wherein at least part of the amine groups present in the fatty acid-modified epoxy amine adduct $ZYW_S$ is converted in a salt form by an acid, with
at least one epoxy compound X.

3. The aqueous dispersion according to claim 2, wherein the at least one epoxide compound X has at least two epoxide groups per molecule and is selected from diglycidyl ethers of aromatic or aliphatic diols and diglycidyl esters of aromatic or aliphatic diacids.

4. The aqueous dispersion according to claim 1 wherein the dispersion is obtained by a process comprising the steps of:
a) obtaining a fatty acid-modified epoxy amine adduct $ZYW_S$ by a process comprising the steps of reacting:
at least one epoxide compound Z containing at least one epoxide groups,
at least one amine Y containing at least one primary or secondary amino group, and
at least one fatty acid $W_S$, wherein the fatty acid contains at least 8 carbon atoms and has an iodine number according to DIN 53241-1:1995-05 lower than 30,
b) adding to the fatty acid-modified epoxy amine adduct $ZYW_S$ obtained in step (a) water and at least one acid, in an amount such that the ratio acid value/amine value of the fatty acid-modified epoxy amine adduct $ZYW_S$ is at least 0.05 thereby at least partially protonating the amino groups,
c) optionally reacting the adduct $ZYW_S$ obtained in step (b) with at least an epoxide compound X having at least one epoxide groups per molecule, the amount of said epoxide compound X being such that the equivalent number of amino groups in $ZYW_S$ which are reactive in respect of reaction with an epoxide group is at least equal to the equivalent number of the epoxide groups in the epoxide compound X, thereby obtaining a compound $ZYW_SX$, and
d) polymerizing one or more ethylenically unsaturated monomers in presence of the fatty acid-modified epoxide amine adduct $ZYW_S$ obtained at step (b) or in presence of the compound $ZYW_SX$ obtained at step (c), said one or more unsaturated monomers having less than 15% solubility in water, measured at 25° C. as a percentage of grams of dissolved monomers per 100 grams of water, thereby forming a hydrophobic polymer V.

5. The aqueous dispersion according to claim 4, wherein the at least one fatty acid-modified epoxy amine adduct $ZYW_S$ and/or the $ZYW_SX$ has an amine value according to DIN 53176:2002-11 of at least 50 mg KOH/g.

6. The aqueous dispersion according to claim 4, comprising
from 10 to 40 wt % of the at least one fatty acid-modified epoxy amine adduct $ZYW_S$ and/or the $ZYW_SX$, and
from 60 to 90 wt % of at least one polymer V, based on the sum of the at least one fatty acid-modified epoxy amine adduct $ZYW_S$ and/or the $ZYW_SX$ and V.

7. The aqueous dispersion according to claim 1, wherein the epoxy Z of the at least one fatty acid-modified epoxy amine adduct $ZYW_S$ is an epoxide compound that has at least two epoxide groups per molecule and is selected from diglycidyl ethers of aromatic or aliphatic diols and diglycidyl esters of aromatic or aliphatic diacids.

8. The aqueous dispersion according to claim 1, wherein the amine Y of the at least one fatty acid-modified epoxy amine adduct $ZYW_S$ is an amine that is selected from aliphatic, linear, branched or cyclic amines comprising from 2 to 20 carbon atoms and comprises at least an amine Y1 comprising at least one primary amine and/or an amine Y2 comprising at least one secondary amine.

9. The aqueous dispersion according to claim 1, wherein the fatty acid $W_S$ of the at least one fatty acid-modified epoxy amine adduct $ZYW_S$ is a fatty acid that is selected from the group consisting of caprylic acid, decanoic acid, lauric acid, myristic acid, palmic acid, stearic acid, and mixtures thereof.

10. The aqueous dispersion according to claim 1, wherein the at least one polymer V is obtained from the polymerization of at least one or more (meth)acrylate monomers, styrenic monomers, (meth)acrylamide monomers, vinyl carboxylate monomers or a combination thereof.

11. The aqueous dispersion according to claim 1, wherein the at least one polymer V is obtained from a monomer mixture containing at least 15 wt % and not more than 90 wt % of monomers having a glass transition temperature Tg of their homopolymerisate of at least 50° C.

12. The aqueous dispersion according to claim 1, having a mass fraction of solid of from 10 to 60%, as determined according to DIN 55671:2002-09.

13. Process for the preparation of the aqueous dispersion according to claim 1 comprising the steps of:
a) obtaining the fatty acid-modified epoxy amine adduct $ZYW_S$ by a process comprising the steps of reacting:
at least one epoxide compound Z containing at least one, epoxide groups,
at least one amine Y containing at least one primary or secondary amino group, and
at least one fatty acid $W_S$, wherein the fatty acid contains at least 8 carbon atoms and has an iodine number according to DIN 53241-1:1995-05 lower than 30,
b) adding to the fatty acid-modified epoxy amine adduct $ZYW_S$ obtained in step (a) water and at least one acid, in an amount such that the ratio acid value/amine value of the fatty acid-modified epoxy amine adduct $ZYW_S$ is at least 0.05 thereby at least partially protonating the amino groups,
c) optionally reacting the adduct $ZYW_S$ obtained in step (b) with at least an epoxide compound X having at least one, epoxide groups per molecule, the amount of said epoxide compound X being such that the equivalent number of amino groups in $ZYW_S$ which are reactive in respect of reaction with an epoxide group is at least equal to the equivalent number of the epoxide groups in the epoxide compound X, thereby obtaining a compound $ZYW_SX$, and
d) polymerizing one or more ethylenically unsaturated monomers in presence of the fatty acid-modified epoxide amine adduct $ZYW_S$ obtained at step (b) or in presence of the compound $ZYW_SX$ obtained at step (c) thereby forming the polymer V.

14. The process according to claim 13, wherein step c) is executed and wherein the amount of each of said epoxide compound X is such that the equivalent number of amino groups in $ZYW_S$ which are reactive in respect of addition reaction with an epoxide group is at least 10% greater than the equivalent number of the epoxide groups in the epoxide compound X.

15. The process according to claim 13, wherein in step b) the ratio acid value/amine value of the fatty acid-modified epoxy amine adduct $ZYW_S$ is from 0.2 to 1.0.

16. A process for preparing a coated substrate or article, comprising the step of coating at least part of the surface of the substrate or article with the aqueous dispersion according to claim 1.

17. A substrate or article having at least part of its surface coated with the aqueous dispersion according to claim 1.

* * * * *